United States Patent [19]

Nabulsi et al.

[11] Patent Number: 4,593,235

[45] Date of Patent: Jun. 3, 1986

[54] APPARATUS AND METHOD FOR ELIMINATING VIDEO SHADING EARS

[75] Inventors: Hazem Nabulsi, Santa Clara; Donald D. Kline, Cupertino, both of Calif.

[73] Assignee: Panavision, Inc., Tarzana, Calif.

[21] Appl. No.: 527,387

[22] Filed: Aug. 29, 1983

[51] Int. Cl.⁴ .................................. H01J 29/52
[52] U.S. Cl. .................................. 315/381; 358/223
[58] Field of Search ............... 315/381, 382, 383, 384, 315/385, 386, 10; 357/31; 358/217, 223

[56] References Cited

U.S. PATENT DOCUMENTS

| | | | |
|---|---|---|---|
| 3,431,460 | 3/1969 | Webb | 316/26 |
| 3,548,250 | 12/1970 | van Roosmalen et al. | 315/31 |
| 3,678,195 | 7/1972 | Dillenburger | 178/7.2 |
| 3,683,108 | 8/1972 | Pieters | 178/7.2 |
| 3,755,707 | 8/1973 | Fremont | 315/10 |
| 3,757,161 | 9/1973 | Kline | 315/276 |
| 3,883,773 | 5/1975 | van Roosmalen et al. | 315/10 |
| 3,931,466 | 1/1976 | van den Berg | 178/7.2 |
| 3,955,116 | 5/1976 | van den Berg | 315/10 |
| 4,097,901 | 6/1978 | Peters | 358/223 |
| 4,101,931 | 7/1978 | Yaggy | 358/217 |
| 4,143,305 | 6/1979 | Gibson et al. | 315/379 |
| 4,266,248 | 5/1981 | van Roosmalen | 358/223 |

Primary Examiner—Theodore M. Blum
Assistant Examiner—David Cain
Attorney, Agent, or Firm—Shapiro and Shapiro

[57] ABSTRACT

In a video camera, "shading ears" resulting from charge build-up beyond the ends of the scan lines of the normally scanned area of a camera tube target are eliminated by applying a voltage pulse to a lens electrode of the camera tube, the timing, amplitude, duration, and shape of the pulse being predetermined to extend the scan lines, and also to de-focus the electron beam.

16 Claims, 4 Drawing Figures

APPARATUS AND METHOD FOR ELIMINATING VIDEO SHADING EARS

BACKGROUND OF THE INVENTION

This invention relates to video cameras and is more particularly concerned with the problem of shading ears in video cameras.

In video cameras of the type employing photoconductive targets, for example, such as Vidicon, Plumbicon, Saticon, and Newvicon cameras, the accumulation of electric charge at areas of the target beyond the normally scanned area causes an effect known as "shading ears". Since the tube target integrates incident light, high level charges build up and propagate along the target face to the active video area. The high charge also causes beam pulling near the ends of the raster, changing the sweep velocity and increasing the output of the camera tube. The net effect, as seen on a television receiver, is an increase in brightness of the areas at the edges of the video raster, i.e., "shading ears". One method of eliminating shading ears at the top and bottom of the raster is to modify the vertical deflection voltages in order to speed up the sweep just before and just after vertical retrace so as to scan more of the target area vertically (vertical overscan). Although this method works well in the vertical direction, it is very difficult to implement in the horizontal direction, because speeding up the horizontal sweep in a manner similar to the vertical reduces horizontal retrace time and produces large fly-back pulses which are difficult to accommodate. Moreover, the usual horizontal deflection yokes cannot respond to quick changes in the sweep speed because of their inductance.

In U.S. Pat. No. 3,755,707, issued Aug. 28 1973, it is proposed to reduce edge brightening effects in a camera tube of the Vidicon type by increasing the potential applied to the cathode of the electron gun at and near the beginning and end of field and line deflection in the tube in order to increase beam current. The technique proposed in this patent does not accomplish the results of the present invention, however.

BRIEF DESCRIPTION OF THE INVENTION

In accordance with the present invention it has been discovered that horizontal "ears", that is, shading ears near the ends of the horizontal scan lines, can be effectively eliminated by applying a pulse to a lens electrode of a camera tube, the timing, amplitude, duration, and shape of the pulse being predetermined to extend the scanning beyond the ends of the normal scan lines, thereby to erase undesired charges that build up in these areas. More particularly, in a preferred embodiment a positive pulse, which is applied to the G3 grid (electrostatic focusing electrode) of the tube, begins after the beginning of the video blanking interval but before the beginning of the cathode blanking interval and ends after the end of the cathode blanking interval but before the end of the video blanking interval. The leading and trailing edges of the pulse are ramps each having a rise time and a fall time that is preferably at least about 0.8 microsecond. The height of the pulse may be of the order of 100 volts, with the G3 grid being normally at about 300 volts positive. The invention may also be applied to solve the problem of vertical ears, but other techniques of vertical ear elimination (such as the sweep speed-up technique referred to earlier) are available and are more easily implemented.

The invention will be further described in conjunction with the accompanying drawings, which illustrate a preferred (best mode) embodiment.

DETAILED DESCRIPTION OF THE INVENTION

Figure 1:
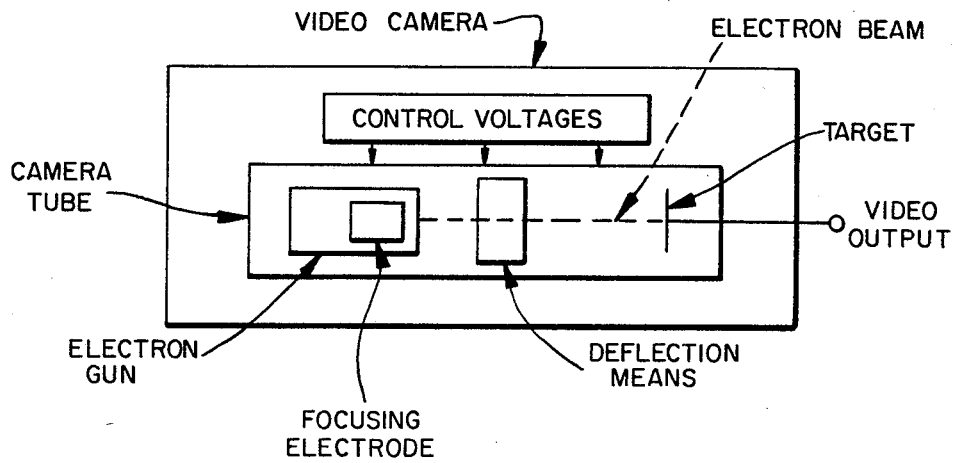
FIG. 1 is a diagrammatic view of a video camera in which the invention may be employed.
Figure 2:
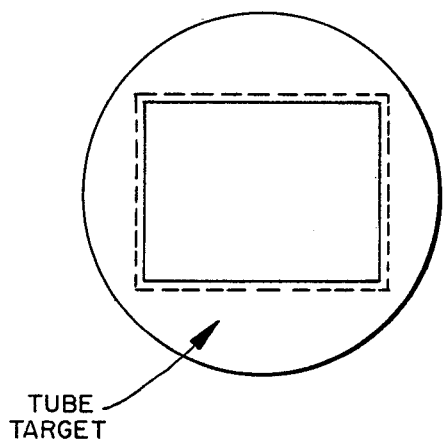
FIG. 2 is a diagrammatic view of the tube target showing the normally scanned area and the active video area.

Referring to the drawings, FIG. 1 illustrates a conventional video camera to which the invention is applied and having a camera tube which may be of the type mentioned earlier. Principal parts of the camera have been designated merely for reference in the description of the invention, and it is not intended to illustrate the details of the camera, which are well known. The electron gun, which includes a cathode, a control grid, a focusing electrode, etc., generates a focused electron beam that is caused, by deflection means, to trace successive scan lines, with retrace therebetween, over the camera tube target. The normally scanned area of the target is illustrated in FIG. 2, as is the active video area of the target (the video output area). In a camera tube having a photoconductive target, the electron beam scanning of the target modifies a charge pattern on the target created by light impinging thereon from an optical system (not shown) and representing an image that is converted to a signal at the video output of the camera in the usual manner. The "control voltages" designated in FIG. 1 include the conventional operating voltages and an unconventional voltage required by the invention, as will be described hereinafter.

As mentioned, in the camera tubes of the type referred to earlier, the target integrates incident light. Charges resulting from image light or bias light beyond the scanned area can reach very high levels. Migration of these charges into the active video area causes shading ears. It has been discovered, in accordance with the invention, that the shading ears in the areas of the target beyond the ends of the scan lines can be eliminated by applying an appropriate pulse at an appropriate time to the focusing electrode of the camera tube.

Figure 3:
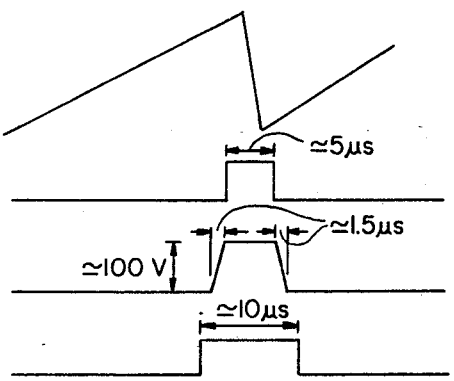
FIG. 3 is a waveform diagram illustrating the invention.

In FIG. 3, operating parameters of a video camera are shown, including waveforms (a), (b), and (d) which represent, respectively, horizontal sweep (including retrace), cathode blanking interval (beam blanking interval), and video blanking interval. In the NTSC system the horizontal sweep is 63.4 microseconds/line (total) with 54 microseconds/line being active video. The cathode blanking interval is approximately 5 microseconds and is centered in the video blanking interval, which is approximately 10 microseconds. Thus, the cathode blanking interval starts about 2.5 microseconds after the beginning of the video blanking interval and ends approximately 2.5 microseconds before the end of the video blanking interval. Line retrace occurs during cathode blanking, when the electron beam is biased off.

In accordance with the invention as applied to video cameras of the type mentioned earlier, as shown in FIG. 3 at (c) a positive voltage pulse, which may be of the order of 100 volts, is applied to the focusing electrode (G3 grid) of the camera tube during the video blanking interval (producing a modified G3 voltage). The duration of this pulse is preferably somewhat greater than the cathode blanking interval and is less than the video blanking interval. The leading and trailing edges of the pulse are ramps each having a rise and fall time that is preferably at least about 0.8 microsecond. In a particular embodiment of the invention, 1.5 microseconds was found to be suitable, as shown in FIG. 3(c), where the length of the top of the pulse is about the same as the duration of the cathode blanking interval. The voltage of the focusing electrode may normally be about 300 volts positive and may rise to about 400 volts positive when a pulse in accordance with the invention is applied thereto.

Figure 4:
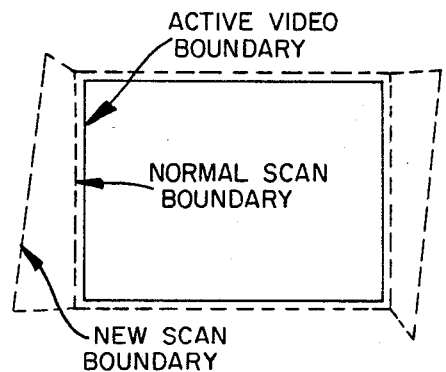
FIG. 4 is a diagrammatic view showing an effect of the invention with respect to scanning of the target.

The principal effect of the invention is to increase the horizontal scan as illustrated in FIG. 4. The new scan boundary illustrates the extension of the scanned area beyond the normal scanned boundary, which is effective to erase charges that build up beyond the ends of the normal horizontal scan lines, thereby to eliminate "horizontal ears". The tapered shape of the newly scanned areas defined between the normal scan boundary and the new scan boundary results from the fact that the voltage pulse applied to the focusing electrode does not affect successive scan lines to the same extent. The ramp configuration of the leading and trailing edges of the pulse applied to the focusing electrode is intended to avoid an abrupt step in the electron beam scanning and to provide substantially uniform overscanning of each horizontal line beyond the active video area.

A further effect of the invention is that the pulse applied to the focusing electrode de-focuses the electron beam, thereby making the beam spot on the target larger, which assists in erasing residual charges.

As noted earlier, the invention may also be employed to eliminate "vertical ears". This would require the application of an appropriate voltage pulse to the focusing grid to produce vertical overscan before and after vertical retrace. However, as also noted earlier, other techniques for eliminating vertical ears are available and can be implemented more easily.

While a preferred embodiment of the invention has been shown and described, it will be apparent to those skilled in the art that changes can be made in this embodiment without departing from the principles and spirit of the invention, the scope of which is defined in the appended claims. For example, the invention may be employed to overcome similar problems in other video cameras by modifying the voltage on an appropriate "lens" electrode of the camera tube to cause overscan.

The invention claimed is:

1. A video camera comprising a camera tube that has a target on which an electric charge pattern is created representative of an optical image, that has an electron gun, including a lens electrode, for generating a focused electron beam, and that has deflection means for causing said beam to trace successive scan lines, with line retrace therebetween, over a normally scanned area of said target in order to modify said charge pattern, whereby the charge pattern within an active video area of said target may be converted to a video signal, and wherein undesired electric charges build up at areas beyond the ends of said scan lines of said normally scanned area, said camera being characterized in the provision of means for applying a voltage pulse to said lens electrode, the timing, amplitude, duration, and shape of said pulse being predetermined to cause the electron beam to scan beyond the ends of scan lines of said normally scanned area and thereby to erase said undesired electric charges.

2. A video camera in accordance with claim 1, wherein said lens electrode is a focusing electrode to which said pulse-applying means applies a positive pulse commencing before and ending after said retrace.

3. A video camera in accordance with claim 2, wherein said pulse-applying means applies a pulse that is predetermined to cause de-focusing of said electron beam.

4. A video camera in accordance with claim 2, wherein said pulse-applying means applies a pulse that has a leading edge ramp and a trailing edge ramp.

5. A video camera in accordance with claim 4, wherein said pulse-applying means applies a pulse having a rise time and a fall time that are each at least 0.8 microsecond.

6. A video camera in accordance with claim 4, wherein said pulse-applying means applies a pulse having a rise time and a fall time that are each about 1.5 microseconds.

7. A video camera in accordance with claim 2, wherein the amplitude of said pulse is of the order of 100 volts.

8. A video camera in accordance with claim 2, wherein said camera has operating parameters that include a beam blanking interval during which said retrace occurs and a video blanking interval beginning before and ending after said beam blanking interval, and wherein said pulse is within said video blanking interval and has leading and trailing edge ramps before and after said beam blanking interval, respectively.

9. In a video camera including a camera tube that has a target on which an electric charge pattern is created representative of an optical image, that has an electron gun, including a lens electrode, for generating a focused electron beam, and that has deflection means for causing said electron beam to trace successive scan lines, with line retrace therebetween, over a normally scanned area of said target in order to modify the charge pattern, whereby the charge pattern within an active video area of said target may be converted to a video signal; a method of erasing undesired electric charges that build up at areas beyond the ends of scan lines of said normally scanned area, comprising applying a voltage pulse to said lens electrode of said electron gun, the timing, amplitude, duration, and shape of said pulse being predetermined to cause the electron beam to scan beyond the ends of said scan lines of said normally scanned area and thereby to erase said undesired electric charges.

10. A method in accordance with claim 9, wherein said pulse is a positive pulse commencing before and ending after said retrace.

11. A method in accordance with claim 10, wherein said pulse is predetermined to cause de-focusing of said electron beam.

12. A method in accordance with claim 10, wherein said pulse has a leading edge ramp and a trailing edge ramp.

13. A method in accordance with claim 11, wherein the rise time and fall time of said pulse are each at least 0.8 microsecond.

14. A method in accordance with claim 11, wherein the rise time and fall time of said pulse are each about 1.5 microseconds.

15. A method in accordance with claim 10, wherein the amplitude of said pulse is of the order of 100 volts.

16. A method in accordance with claim 10, wherein said camera has operating parameters that include a beam blanking interval during which said retrace occurs and a video blanking interval beginning before and ending after said beam blanking interval, and wherein said pulse is within said video blanking interval and has leading and trailing edge ramps before and after said beam blanking interval, respectively.

* * * * *